United States Patent [19]

Alatalo et al.

[11] Patent Number: 5,409,255
[45] Date of Patent: * Apr. 25, 1995

[54] TWIST BEAM AXLE

[75] Inventors: Clarke E. Alatalo, Kalamazoo; Gary L. Wells, Augusta; James A. Alberda, Shelbyville, all of Mich.; James L. Floyd, Culver, Ind.

[73] Assignee: Benteler Industries, Inc., Grand Rapids, Mich.

[*] Notice: The portion of the term of this patent subsequent to Sep. 28, 2010 has been disclaimed.

[21] Appl. No.: 115,437

[22] Filed: Sep. 1, 1993

Related U.S. Application Data

[63] Continuation of Ser. No. 823,997, Jan. 22, 1992, abandoned, which is a continuation-in-part of Ser. No. 565,658, Aug. 10, 1990, abandoned.

[51] Int. Cl.⁶ .............................................. B60G 11/18
[52] U.S. Cl. .................................. 280/723; 29/897.35; 29/897.2; 301/124.1; 228/155; 228/144
[58] Field of Search ............... 280/700, 721, 723, 726, 280/665, 689; 180/905; 29/897.35, 897.2, 897.32, DIG. 48; 72/379.2, 319, 321; 301/124 R, 127; 228/155, 144, 173.4, 173.6

[56] References Cited

U.S. PATENT DOCUMENTS

| | | | |
|---|---|---|---|
| 1,908,355 | 5/1933 | Evans | 301/124 R |
| 3,131,576 | 5/1964 | Schilberg | 74/588 |
| 3,362,056 | 1/1968 | Preller | 29/897.35 |
| 3,726,414 | 4/1973 | Konstant | 228/173.4 |
| 3,915,504 | 10/1975 | Bauer | 301/124 |
| 3,951,225 | 4/1976 | Schwenk | 180/73 R |
| 4,232,881 | 11/1980 | Kolbel | 267/188 |
| 4,432,564 | 2/1984 | Tronville | 280/689 |
| 4,486,030 | 12/1984 | Takata | 280/689 |
| 4,596,401 | 6/1986 | Jullien | 280/700 |
| 4,623,164 | 11/1986 | Cassel | 280/689 |
| 4,787,680 | 11/1988 | Bonjean | 301/124 |
| 4,830,400 | 5/1989 | Penot | 280/723 |
| 5,163,225 | 11/1992 | Goleby | 29/897.35 |

FOREIGN PATENT DOCUMENTS

| | | |
|---|---|---|
| 0229576 | 7/1987 | European Pat. Off. . |
| 0249537 | 12/1987 | European Pat. Off. . |
| 2591155 | 6/1987 | France . |
| 2618733 | 2/1989 | France . |
| 2658128 | 8/1991 | France . |
| 3200776 | 7/1983 | Germany . |
| 3412578 | 4/1984 | Germany . |
| 0105815 | 6/1983 | Japan . |
| 452173 | 5/1935 | United Kingdom . |
| 2241209 | 8/1991 | United Kingdom . |
| 9001091 | 2/1990 | WIPO . |

OTHER PUBLICATIONS

Automotive Engineering vol. 90, No. 8, Aug., 1982 pp. 71–78 Rear Axle Designed in Oriented FRP, FIGS. 8, 12, 13.

Primary Examiner—Margaret A. Focarino
Assistant Examiner—Paul N. Dickson
Attorney, Agent, or Firm—Price, Heneveld, Cooper, DeWitt & Litton

[57] ABSTRACT

The specification discloses a vehicle twist beam axle subassembly incorporating a twist beam axle of generally V-shaped cross section formed of two legs which diverge away from the integral bight thereof, the ends of the legs being curled back into elongated generally circular loops weldably bonded to the legs, and the loops having flattened portions to be tuned to a predetermined torsional resistance.

4 Claims, 4 Drawing Sheets

TWIST BEAM AXLE

RELATED APPLICATION

This is a continuation of application Ser. No. 07/823,997, filed on Jan. 22, 1992, which is a continuation-in-part of application Ser. No. 07/565,658, filed Aug. 10, 1990, entitled TWIST BEAM AXLE, both applications being abandoned.

BACKGROUND OF THE INVENTION

This invention relates to vehicle axles and axle subassemblies, and particularly to trail arm twist beam axles and axle subassemblies.

A trail arm twist beam axle is intended to semi-isolate one wheel of a vehicle such as an automobile from the opposite wheel. Connection points are made to the body mounts, wheel spindles, shocks and springs, as well as to track bars for lateral stability. Individual component pieces typically making up an axle assembly include the twist beam, trail arms, flanges, spring supports, jounce bumpers, shock mounts, bushing mounts and torsion bar.

Various cross sectional configurations have been suggested for twist beam and torsion bar elements heretofore, although typically a twist beam comprises an inverted, U-shaped beam for bending loads, coupled with a separate solid torsion rod of different material and characteristics from those of the beam, and extending through the open central portion of the beam, for accommodating torsional loads. The U-shaped beam is normally a drawn or stamped member which is not strong in torsion. Both ends are attached to stubs extending in from the spring seats. The separate rod to control torsional loads is specially fabricated of a high strength steel. Its ends are attached separately from, and in a special relationship relative to, the ends of the beam. The material costs, manufacturing costs and assembly costs of the two-piece twist beam and torsion bar arrangement are significant.

SUMMARY OF THE INVENTION

The present invention involves a specially configured one-piece, one material, twist beam axle capable of handling both bending loads and torsional loads. The novel beam has integral components preferably formed of a generally V-shaped beam portion, having a pair of legs divergent relative to each other from an integral apex, a portion of the legs being curled into a generally circular loop and welded, forming an integral one-piece, multiportion twist beam axle. No separate torsion bar is provided or necessary. The integral, one piece, one material twist beam axle is "tuned" to match the needed torsion resistance for the particular style and weight vehicle. One preferred embodiment depicted illustrates a trail arm axle subassembly wherein the one piece load and torsion beam is tuned by having flattened portions of outwardly curled loops which lie against the legs. These are illustrated at the ends of the beam and extend inwardly from the junctures thereof with the trail arms. Tuning of the novel twist beam is preferably achieved by having portions of the leg loops flattened at the ends where they are welded to the trail arms. Further, tuning to a particular ride/handling characteristic can be achieved by variance in the length and location of the flattened portions, length of weld of the loops to the beam legs, the number of loops, loop diameter, and leg and loop thickness. Another embodiment depicted (FIGS. 7–9) has the distal ends of both legs curled back inwardly on the legs and welded. Another depicted embodiment (FIG. 10) has the distal ends of both legs curled back outwardly to be edge abutted with the beam legs and welded. Another embodiment depicted (FIG. 12) has a loop intermediate the legs and welded closed at the inner ends of the legs.

This novel one-piece twist beam axle is considerably less expensive in material, forming and assembly costs than the prior structure requiring a torsion bar, yet functions remarkably well and is tunable to the installation. Assembly requires attachment of both ends of just this one member rather than two specially arranged components of different materials. It provides controllable torsional stiffness and beam strength while reducing mass and cost.

These and other objects, advantages and features of the invention will become apparent upon studying the following specification in conjunction with the drawings.

DESCRIPTION OF THE PREFERRED EMBODIMENT

Figure 1:
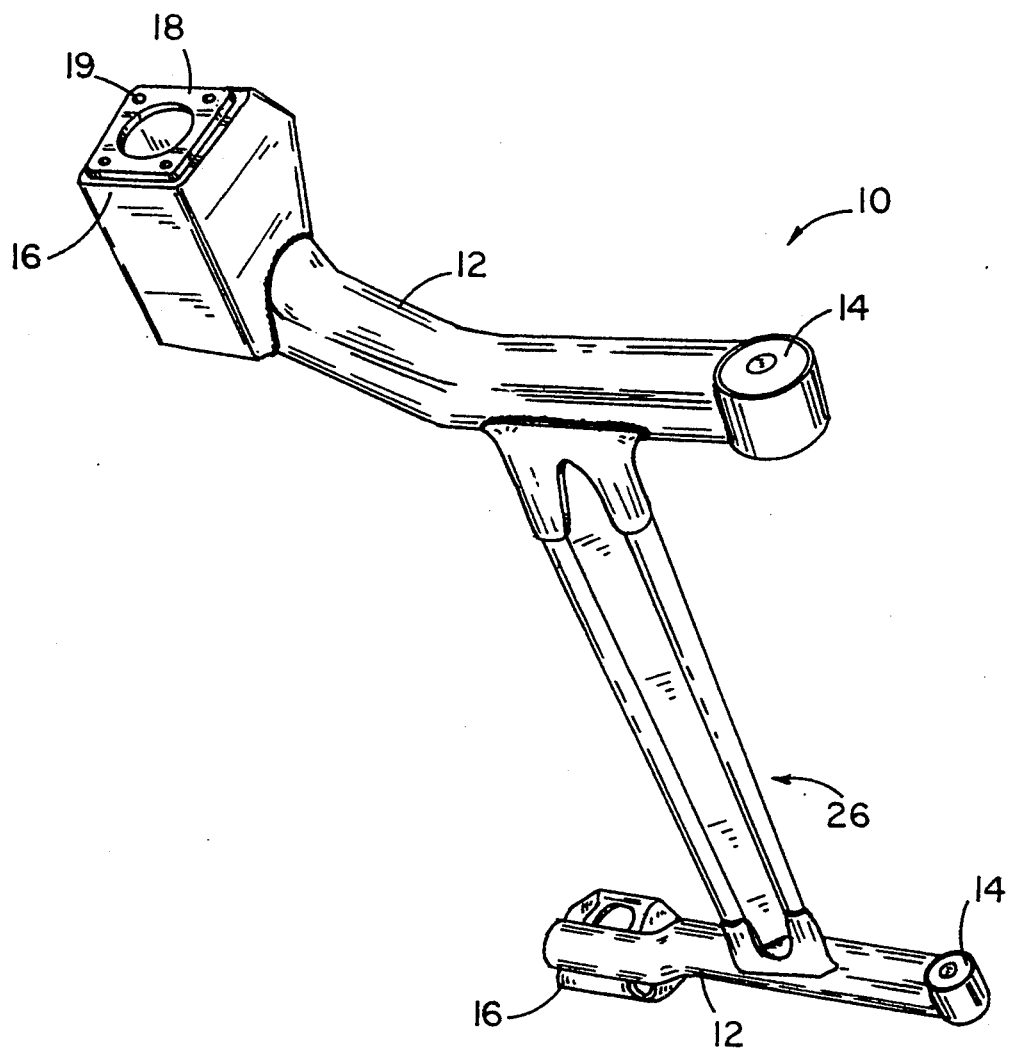
FIG. 1 is a perspective view of a vehicle trail arm and axle subassembly incorporating a tuned load and torsion beam.
Figure 2:
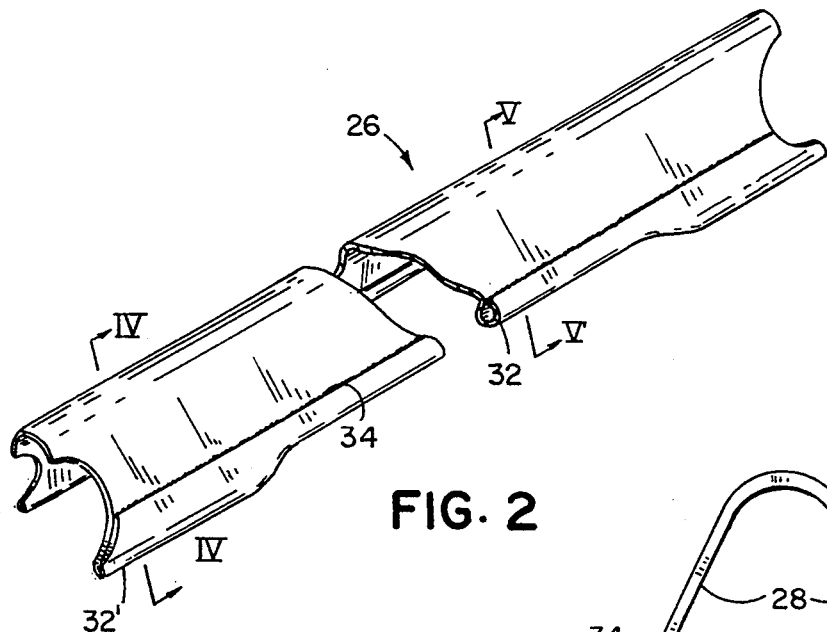
FIG. 2 is an isometric view of the tuned load and torsion beam in FIG. 1.
Figure 3:
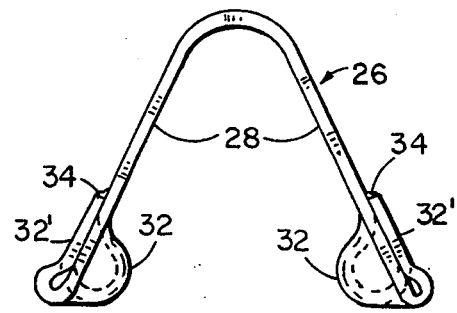
FIG. 3 is an end view of the tuned load and torsion beam in FIG. 2.
Figure 4:
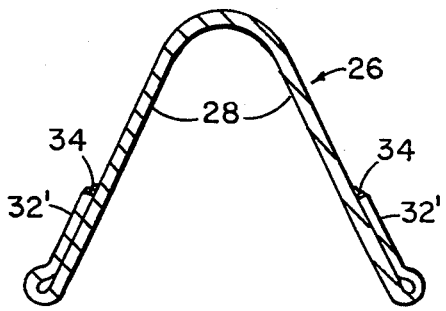
FIG. 4 is a sectional view taken on plane IV—IV of FIG. 3.
Figure 5:
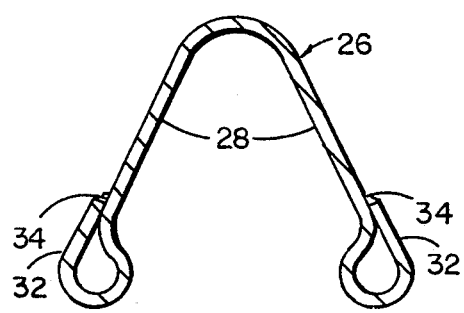
FIG. 5 is a sectional view taken on plane V—V of FIG. 3.
Figure 6:
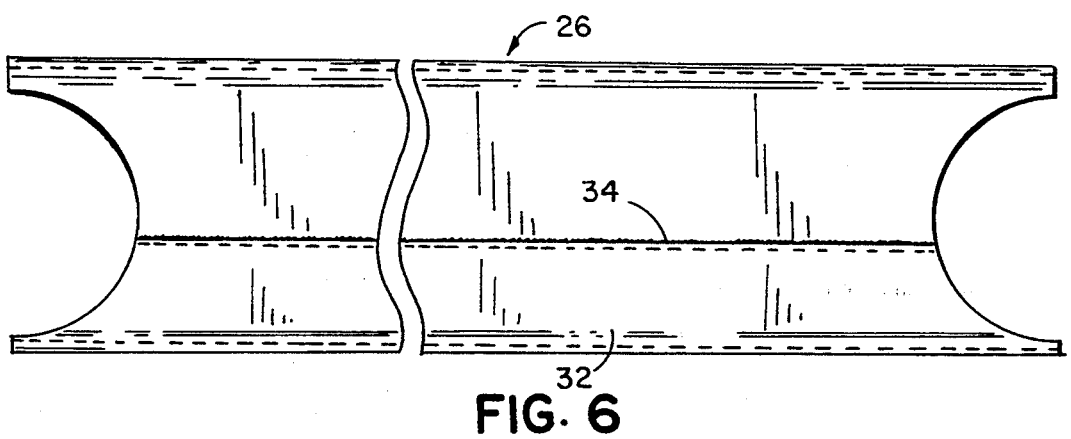
FIG. 6 is an elevational view of the tuned load and torsion beam in FIG. 2.

Referring now specifically to the drawings, the twist beam axle subassembly 10 depicted in FIG. 1 includes a pair of similar, laterally spaced, mirror image trail arms 12, each having a pivotal mount bushing 14 at the front end thereof for attachment to a vehicle frame, and a wheel mount 16 at the rear end of the arms. These wheel mounts extend laterally in opposite directions, i.e., outwardly relative to the vehicle frame, and have a conventional wheel mounting surface 18 shown as a flat plate having orifices 19 therein for bolting the wheel in position. The individual wheels should have a certain amount of independence from the opposite wheel. This is normally achieved by having a twist beam of one type of material, and an elongated torsion bar of another type of material (FIG. 13), as noted above. The trailing arm subassembly will also include spring pockets and shock mounts.

Mounted to both of the trail arms is the novel twist beam axle 26, which by its unique construction serves both functions of providing beam strength and torsional resistance, of a controlled amount to suit the particular handling and ride characteristics for the particular vehicle, i.e., to suit the particular vehicle construction and weight. Twist beam axle 26 is "tuned" in the manner described hereinafter, to achieve a predetermined controlled torsion resistance characteristic for the particular vehicle. The axle has an elongated structure along an elongated axis, including a pair of elongated legs extending transversely to the noted axis and here shown to be in an inverted generally "V" construction (FIGS. 2-5) with the apex of the cross-sectional configuration being slightly rounded. The outer distal ends of these legs 128 are specially formed by being curled back upon themselves to form closed loops 32. The looped outer ends engage the legs 28 by lying flat and parallel thereagainst (in the first embodiment), with the outer edge being welded to the legs by a fillet weld zone 34. This parallel engagement enables the loops to be flattened without undue stress on the weld zone. The beam can be made of plain carbon steel or high strength, low alloy steel.

Controlled portions of these loops are then flattened as at 32′. This flattened zone preferably includes the areas at the ends of the twist beam axle where it is to be welded to the trail arms. Control of the linear amount of the loops which is flattened enables variation of the torsional resistance. The more area that is flattened, the less the torsional resistance, so that the characteristic beam can be closely tailored, i e., "tuned" to the particular vehicle to be accommodated. It has also been determined that flattening at the location of the weld to the trail arms considerably lessens the stress at the weld joints, giving further assurance against failure at this location of maximum stress. This controlled amount of flattening can be achieved using a conventional press, pressing rolls, or other equivalents. The novel axle can, for example, be made by roll forming flat steel stock, e.g., unwound from a coil, to create the tubular or loop portions at the distal ends of the legs, welding the edges to the legs to form the closed loop solid structure, cutting the formed stock into sections of desired length, flattening designated portions of the loops before or after cutting, and bending the generally flat stock on a press brake or the equivalent to form the V-shape configuration. The ends of the beam are also preferably scalloped as shown in FIGS. 2-6 to a concave configuration matching the convex configuration of the exterior surface of the trail arms.

Additional torsional tuning of the axle may also be assisted by the length and amount of weld zone 34 between the loops and the legs 28 upon which they are curled and engage. These weld zones can be at spaced intervals, over the whole length, on one leg, on both legs, or other variations to achieve a desired torsional resistance. Additional tuning can also be achieved by variation of the thickness of the beam legs, and diameter of loops 32. Therefore, by minor variations in the production techniques, the manufacturer can readily accommodate a wide variety of vehicle characteristics.

The cost of construction of this one piece twist beam axle is markedly less than the prior art construction presently used.

Extensive testing of the novel construction of FIGS. 1-6 has demonstrated its effectiveness, in spite of its ultimate simplicity. The axle can be readily formed from a flat elongated piece of steel stock, using forming rollers and/or a brake press, or other known forming equipment. The elimination of the special torsion rod significantly lowers the cost of construction, cost of materials, cost of separate mounting means on the ends, and assembly costs. Furthermore, production of a wide variety of unit characteristics with desired load and handling can be made using the same equipment and like starting material. The variations can be achieved quickly and easily during fabrication.

Figure 7:
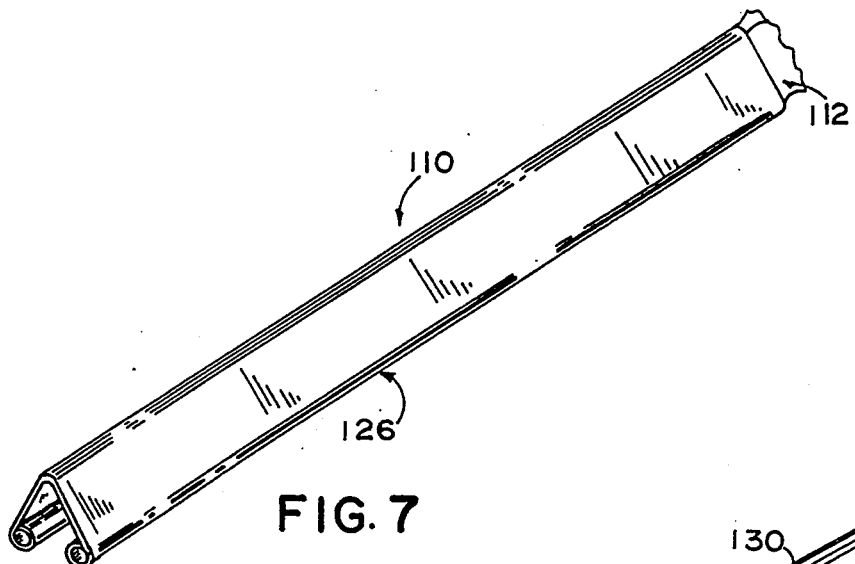
FIG. 7 is a fragmentary isometric view of a portion of a swing arm vehicular axle subassembly incorporating another embodiment.

In FIGS. 7-12 are shown other embodiments. These less preferred embodiments are not shown to have flattened loop portions. The vehicular axle subassembly 110 depicted in FIG. 7 is for one side of the vehicle, the opposite side being a mirror image thereof. In this subassembly, the numeral 112 indicates conventional wheel components of a trailing arm subassembly including spring pockets and a trailing arm of conventional type having a stub axle extending laterally from its mounting flange to mount a wheel. Identical components to these are on the opposite side of the vehicle in mirror image thereto. These components on opposite sides are interconnected to and by the novel twist beam axle 26 attached by welding. These added components are assembled in conventional fashion and therefore are not described in detail herein.

Figure 8:
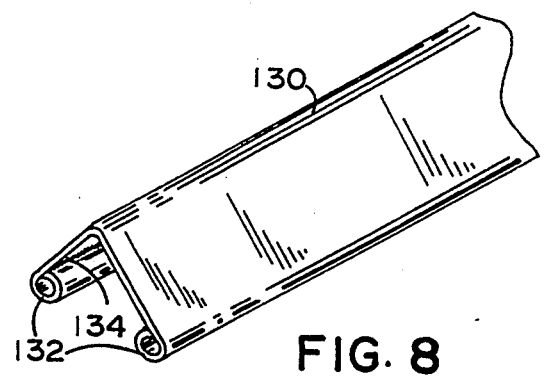
FIG. 8 is an enlarged isometric view of the left end of the novel twist beam axle of the subassembly in FIG. 7.
Figure 9:
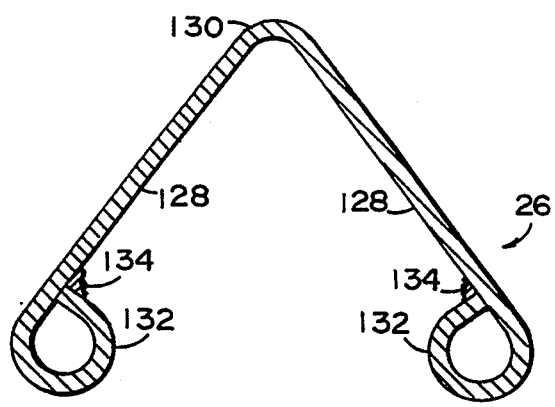
FIG. 9 is a further enlarged cross sectional view of the twist beam axle in FIG. 7.

Twist beam axle 126 in FIGS. 7, 8 and 9 is an integral, elongated unit formed of a pair of legs 128 in generally V-shaped configuration in cross section, integrally joined at the apex 130 (FIG. 9). The outward distal ends of legs 128 are curled back inwardly upon themselves, with the distal edges in direct abutment with the legs, to form elongated, generally cylindrical loops 132 generally circular in cross section. I.e., these ends curl inwardly toward each other as shown. The curled back ends are weldably bonded by fillet weld zones 134 to legs 128, to cause the loops to be peripherally closed. This integral unit can be made of plain carbon steel, or high strength low alloy steel. The novel structure effects unique beam strength and torsional resistance, while still being of less mass and lower cost than the prior art structure.

Figure 13:
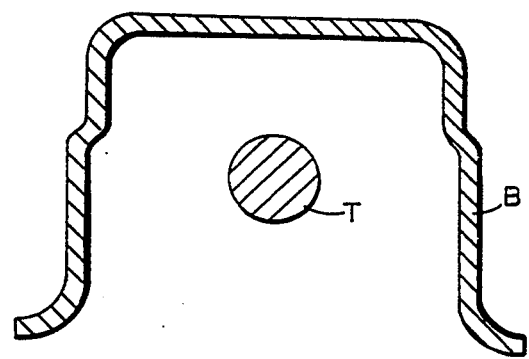
FIG. 13 is a cross sectional view of the prior art beam and torsion bar components.

The typical prior art structure, as shown in FIG. 13, includes a generally U-shaped, stamped beam B in combination with a separate elongated solid torsion bar T made of special material. The ends of beam B are attached to the supports, while the ends of torsion bar T are separately attached to the vehicle supports. The use of these separate components causes this prior art subassembly to be more expensive and have greater mass than the inventive apparatus.

Figure 11:
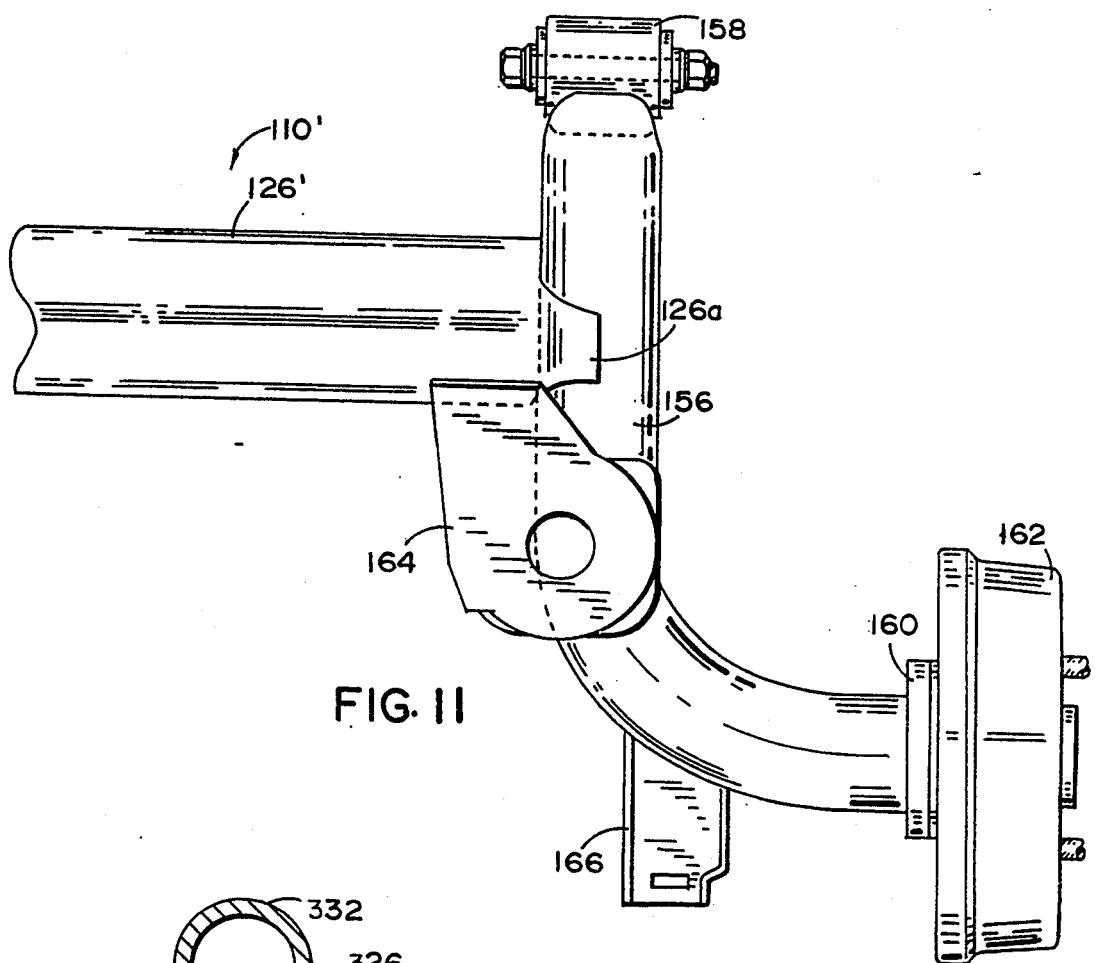
FIG. 11 is a plan view of a different trail arm axle subassembly incorporating an embodiment of this invention.

In FIG. 11 is depicted an axle subassembly 110 employing the twist beam of the second embodiment in combination with a conventional tubular trailing arm unit. Specifically, the beam 126′ has the same cross sectional configuration as in FIG. 8 but a modified end flange 126a of arcuate shape to follow the outer surface of tubular trailing arm 156. This arm has a bushing mount 158 on the forward end, for attachment to the vehicle frame (not shown). The other, rear, end of arm 156 curves outwardly through a 90° turn to extend laterally. An outer flange 160 on the arm mounts wheel drum 162. To the rear of beam 126' is a spring seat 164, and to the rear of that is a shock bracket 166. Hence, vertical movement of the wheel (not shown) on drum 162 is against the bias of the spring, dampered by the shock absorber, the trailing arm pivoting about trunnion mount 158. This movement in one arm causes twisting of beam 126'.

Figure 10:
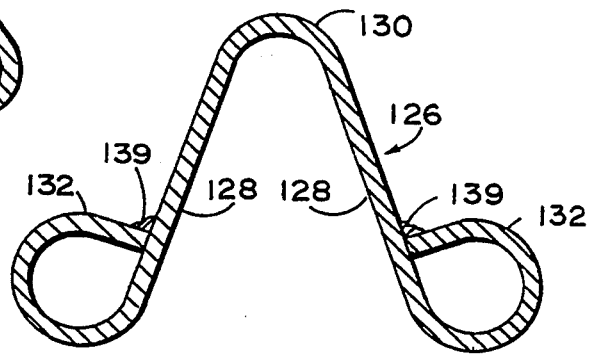
FIG. 10 is a cross sectional view of still another embodiment of twist beam axle.

Alternatively to the above described embodiment of the twist beam, the lower distal ends of legs 128 can be made to curl outwardly relative to the V-shaped configuration and abut the legs with edge abutment, as depicted on alternative beam cross section 222 in FIG. 10. Specifically, this unit 222 has a pair of legs 228 which extend divergently away from each other relative to integral apex 230, the outer distal ends of legs 228 curling outwardly back upon themselves to form tubular portions 232 which are generally circular loops in cross section, weldably bonded by fillet weld zones 234 at the intersection to close the periphery thereof. The method of forming this structure could be comparable to that set forth for the prior embodiment, except that the bending action is in the opposite direction. Conceivably, alternative constructions of these embodiments, but having only one loop, could be employed.

As to the orientation of the space between the legs of the generally V-shaped twist beam axle in the final subassembly, such space is preferably downwardly oriented. Alternatively, it could be forwardly or rearwardly oriented. It is normally not desired to have this space directly upwardly oriented, since it would tend to catch debris, moisture, etc. which could cause deleterious effects upon the beam.

Figure 12:
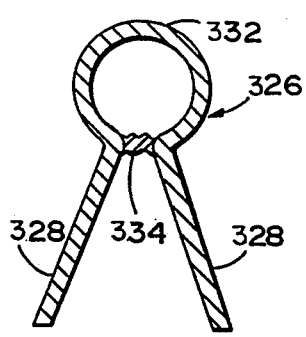
FIG. 12 is a cross sectional view of a still further embodiment.

In FIG. 12 is depicted the cross section of an elongated twist beam 326 wherein a cylindrically shaped portion or loop 332 is intermediate of, i.e., at the apex of, and integral with divergent legs 328. The loop 332 thus extends between the inner ends of legs 328. Weldment 334 between these inner ends bonds the legs together and also completes loop 332 to peripherally close it. One or both of the distal ends of beam 326 could also be provided with loops.

Those skilled in the art will readily understand the inventive concept and construction from the above description. It may be desirable in certain types of vehicles to make minor changes to accommodate the situation. Such minor changes are deemed to be part of this invention which is not intended to be limited by the preferred embodiments disclosed as illustrative, but only by the scope of the appended claims and the equivalent structures to those defined therein.

The embodiments of the invention in which an exclusive property or privilege is claimed are defined as follows.

1. A vehicle trailing arm and torsion-bar-free unitary, twist beam axle assembly comprising:
   a pair of mirror image trailing arms, each having a pair of ends, a pivotal connector on one said end for attachment to a vehicle frame, and a wheel mount on the other said end for mounting a vehicle wheel;
   a torsion-bar-free, unitary twist beam axle having an axis transverse to said pair of trailing arms, and capable of handling both vehicle suspension bending loads and torsional loads between said trailing arms;
   said unitary twist beam being elongated in the direction of said axis and having a pair of opposite mounting ends;
   said twist beam having a pair of legs extending substantially the length of said twist beam axle, and extending transversely of said axis to elongated outer distal ends;
   said distal ends of said legs having elongated portions looped back upon said legs in a manner to lie against said legs and to form elongated loops, said loops being welded closed by welding said elongated outer distal ends to said legs;
   said loops being flattened at said opposite mounting ends, and said mounting ends being welded to said pair of trailing arms:
   said loops being flattened to lie against said legs in select areas away from said mounting ends to tune the torsional resistance of said beam to a predetermined value.

2. The assembly in claim 1 wherein said outer distal ends are welded along substantially the entire length thereof to said elongated legs.

3. The assembly in claim 1 wherein said loops are also flattened a substantial distance from said mounting ends for tuning the torsional resistance to a predetermined amount.

4. A torsion-bar-free, unitary, vehicle twist beam axle capable of accommodating both bending loads and torsional loads, comprising:
   a one-piece, integral twist beam elongated in one directions, having a pair of legs elongated in said one direction and extending divergently away from each other transverse to said one direction to outer distal ends, and having at least one generally cylindrical portion integral with said legs loop back upon itself into a peripherally closed loop;
   said generally cylindrical portion being peripherally closed along its length by weldment;
   said beam having a pair of mounting ends for attachment to vehicle suspension trailing arms;
   said generally cylindrical portion being intermediate said legs.

* * * * *